(12) United States Patent
Jin et al.

(10) Patent No.: US 8,077,809 B2
(45) Date of Patent: Dec. 13, 2011

(54) LINK ADAPTATION BASED ON GENERIC CINR MEASUREMENT ACCORDING TO LOG-LIKELIHOOD RATIO DISTRIBUTION

(75) Inventors: Hang Jin, Plano, TX (US); Hanqing Lou, Garland, TX (US); Ahmadreza Hedayat, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 12/233,998

(22) Filed: Sep. 19, 2008

(65) Prior Publication Data

US 2009/0086855 A1    Apr. 2, 2009

Related U.S. Application Data

(60) Provisional application No. 60/976,395, filed on Sep. 28, 2007.

(51) Int. Cl.
*H04L 27/06* (2006.01)

(52) U.S. Cl. ........ 375/341; 375/262; 375/267; 375/299; 375/340; 375/347; 455/101; 455/132; 455/296; 455/500; 455/522; 370/335; 370/342; 714/794; 714/795; 714/796

(58) Field of Classification Search ............... 375/262, 375/340, 341, 267, 299, 347; 455/522, 101, 455/132, 296, 500; 714/794, 795, 796; 370/335, 370/342

See application file for complete search history.

(56) References Cited

U.S. PATENT DOCUMENTS

| | | | |
|---|---|---|---|
| 2003/0072395 A1* | 4/2003 | Jia et al. | 375/341 |
| 2003/0103470 A1 | 6/2003 | Yafuso | |
| 2004/0120411 A1* | 6/2004 | Walton et al. | 375/260 |
| 2008/0051095 A1* | 2/2008 | Chang et al. | 455/446 |

FOREIGN PATENT DOCUMENTS

WO    2004086671 A1    10/2004

OTHER PUBLICATIONS

Lamarea M. et al., "Decoding Algorithms for Reconfigurable Space-Time Turbo Codes," International Conference on Acoustics, Speech, and Signal Processing; vol. 5, Apr. 6-10, 2003, pp. V_129-V_132.
Communication Relating to the Results of the Partial International Search dated Apr. 1, 2009 cited in PCT/US2008/077169.

* cited by examiner

*Primary Examiner* — Leon Flores
(74) *Attorney, Agent, or Firm* — Edell, Shapiro & Finnan, LLC (57) ABSTRACT

Techniques are provided to compute the carrier to interference-plus-noise ratio (CINR) in a wireless communication system using log-likelihood ratio (LLR) data generated from a received transmission. The LLR data are collected as they are sent from a detector to a forward error correction (FEC) decoder in a wireless communications device. In one embodiment, decision-aided LLR based CINR is computed using the decoded bits output from the FEC decoder as feedback. In another embodiment, blind LLR based CINR is computed without feedback. The CINR may be used to adjust a modulation and/or coding parameters associated with wireless communication between wireless communication devices.

27 Claims, 4 Drawing Sheets

LINK ADAPTATION BASED ON GENERIC CINR MEASUREMENT ACCORDING TO LOG-LIKELIHOOD RATIO DISTRIBUTION

CROSS REFERENCE TO RELATED APPLICATIONS

This application claims priority to U.S. Provisional Patent Application No. 60/976,395, filed Sep. 28, 2007, the entirety of which is incorporated herein by reference.

TECHNICAL FIELD

The present disclosure relates to wireless communication technology and particularly to techniques for adjusting parameters associated with a wireless communication link between first and second wireless communication devices.

BACKGROUND

Link adaptation is an important feature in modern wireless communication systems. Utilizing link adaptation, a first communication device, e.g., a base station (BS), adapts the modulation and/or coding parameters for the radio channel conditions when communicating with a second communication device, e.g., a mobile station (MS). Link adaptation systems require knowledge of the channel conditions at the transmitting device. Channel information can be measured at a receiving device, e.g., the MS and fed back to the BS, or vice versa.

Generally, there are two methods for adapting modulation and/or coding parameters. Both methods involve measuring a carrier to interference-plus-noise ratio (CINR) at the receiving device, e.g., the MS. The first method involves the MS transmitting the measured CINR to the BS in the form of what is referred to as a "physical" CINR (PCINR) report. The second method is called an effective CINR (ECINR) report, and involves the MS determining adjustments to the modulation and/or coding parameters, and transmitting the adjustments to modulation and/or coding parameters to the BS.

Most existing CINR measurement methods are transmission scheme and detection scheme dependent. CINR for single antenna systems, like single-input single-output (SISO) systems, is simply defined as the signal-to-noise ratio at the receiver. For multiple antenna systems, e.g., multiple-input multiple-output (MIMO) systems, the CINR is dependent on the channel condition, transmission scheme, and detection scheme. In addition, current CINR measurements are not accurate in certain situations. For example, in the WiMAX™ communication standard, CINR measurement for MIMO spatial multiplexing with maximum likelihood detection is defined according to channel capacity. However channel capacity is an ideal quantity that does not account for systemic imperfections such as frequency offset or clock/time offset.

Accordingly, a technique for generic CINR measurement, independent of transmission scheme, detection scheme, and one that accounts for systemic imperfections in a wideband wireless communication system would be useful for making adjustments in the wireless communication system modulation and/or coding parameters.

DESCRIPTION OF EXAMPLE EMBODIMENTS

Overview

Techniques are provided herein for generically computing the carrier to interference-plus-noise ratio (CINR), and for using the CINR to adjust a modulation and/or coding parameter associated with wireless communication between first and second wireless communication devices. Log-likelihood ratio (LLR) data is generated from a received transmission at a wireless communication device. The LLR data are collected as they are sent from a detector to the forward error correction (FEC) decoder of the wireless communications device. In one embodiment, decision-aided LLR based CINR is computed using the decoded bits output from the FEC decoder as feedback. In another embodiment, blind LLR based CINR is computed without feedback. The CINR may be used to adjust a modulation and/or coding parameter associated with wireless communication between wireless communication devices.

A received symbol, y, can be represented by y=Hx+n, where H is the channel coefficient in a single-input single-output (SISO) case and the channel matrix in a multiple-input multiple-output (MIMO) case, x is the transmitted symbol, and n is additive white Gaussian noise (AWGN). A detector in a wireless communication device generates soft information about the received symbol y, e.g., LLR data. The LLR data are sent to a forward error correction (FEC) decoder in the communication device. A CINR measurement is made based on LLR data collected as they are sent from the detector to the FEC decoder. Based on the CINR measurement, adjustment data for a modulation and/or coding parameter associated with the wireless communications between the devices may be computed.

In one embodiment, an LLR may be computed as:

$$LLR_k = \log\frac{p(b_k = 0 \mid y)}{p(b_k = 1 \mid y)} \quad (1)$$

where p( ) is a probability function, $b_k$ is the $k^{th}$ addressing bit in the transmitted symbol, and y is the received symbol (or vector of symbols). LLR data form a Gaussian distribution and are sent from the detector to the decoder.

The complexity of LLR data calculations increase exponentially with constellation size. The following approximation may be used as a simplification:

$$LLR_k = \min_{s_0 \in S_0^k} \|y - Hs_0\|^2 - \min_{s_1 \in S_1^k} \|y - Hs_1\|^2 \quad (2)$$

where k is for the $k^{th}$ addressing bit, $S_m^k$ is the set of constellation points, such that the $k^{th}$ addressing bit is m (m could be 0 or 1). For each received bit there is one LLR value. All the LLR data for a codeword are collected right before input to the FEC decoder.

Figure 1:
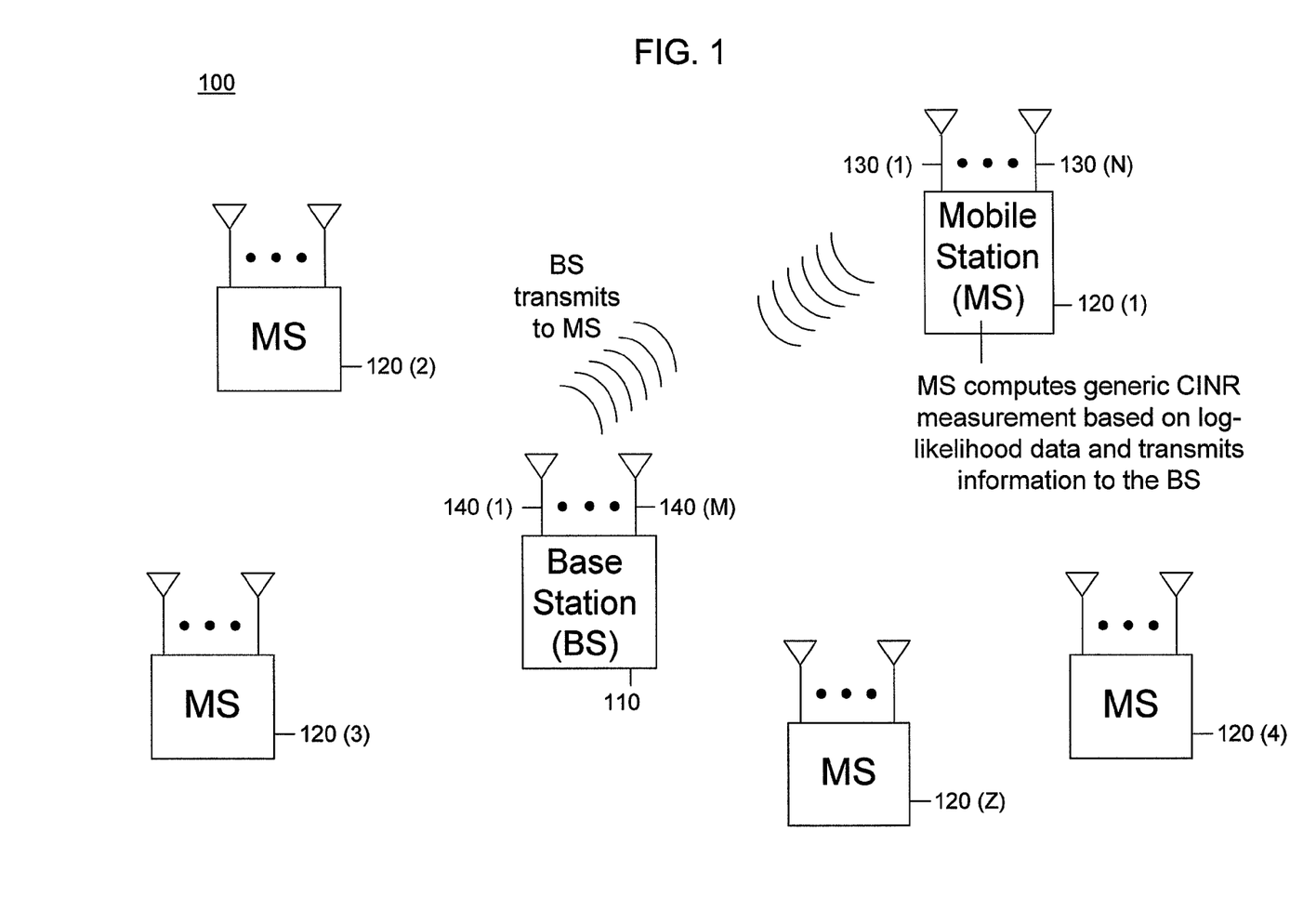
FIG. 1 is an example of a block diagram of a wireless communication system in which a base station wireless communicates with mobile stations using a wideband communication protocol and makes adjustments to modulation and/or coding parameters using a log-likelihood ratio based CINR computation process at a mobile station.

Referring first to FIG. 1, a wireless radio communication system or network is shown generally at reference numeral 100 and comprises a base station (BS) 110, and a plurality of mobile stations (MS's) 120(1)-120(Z). For consistency in subsequent references hereinafter, an MS is referred to as a first communication device and the BS is referred to as a second communication device, but it should be understood that this naming convention is arbitrary. The BS 110 may connect to other wired data network facilities (not shown) and in that sense serve as a gateway or access point through which the MS's 120(1)-120(Z) have access to those data network facilities.

The BS 110 comprises a plurality of antennas 140(1)-140(M) and the MS's 120(1)-120(Z) may also comprise a plurality of antennas 130(1)-130(N). The BS 110 may wirelessly communicate with individual ones of the MS's 120(1)-120(Z) using a wideband wireless communication protocol in which the bandwidth is much larger than the coherent frequency bandwidth. An example of such a wireless communication protocol is the IEEE 802.16 communication standard, also known commercially as WiMAX™.

Techniques are provided herein to enable either device on a wireless communication link (e.g., a BS or an MS) to compute the CINR based on signals that one wireless device received from the other wireless device. For example, as depicted in FIG. 1, the BS 110 transmits a signal to a particular MS, e.g., MS 120(1). The MS 120(1) computes the CINR based on the signals it receives from the BS. The MS 120(1) may then transmit the CINR it computed back to the BS 110. The BS 110 may use the CINR that the MS 120(1) computed to adjust one or more modulation and/or coding parameters associated with future wireless transmissions to the MS 120(1), such as estimating effective CINR values, selection of modulation and coding modes or parameters, and selection of transmission modes among a plurality of transmissions modes including, for example, space time code (STC), multiple-input multiple-output (MIMO), selection of Partial Usage of Subchannels (PUSC) or Adaptive Modulation and Coding (AMC) zones transmission modes (e.g., in a WiMAX communication system), calculating the beamforming weights for uplink transmission, adjusting preceding parameters for downlink transmission. Similarly, the BS 110 may compute the CINR based on signals it receives from a particular MS, e.g. MS 120(1) using the techniques described herein.

Figure 2:
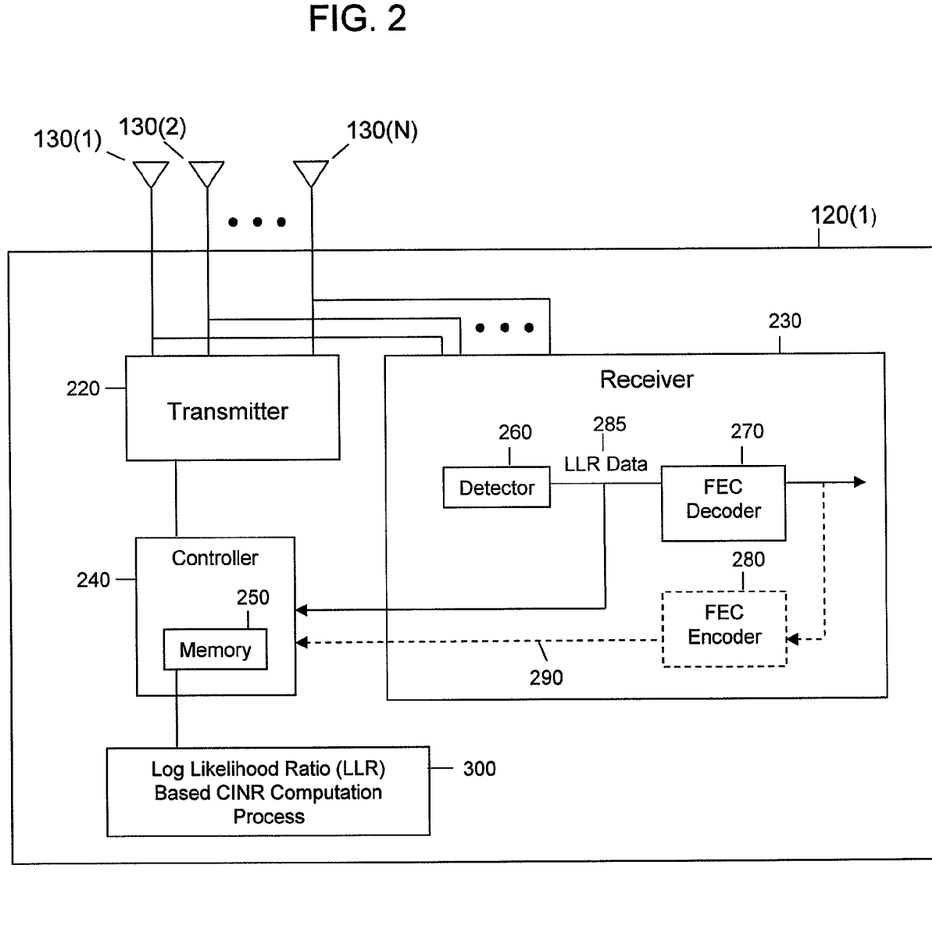
FIG. 2 is an example of a block diagram of a wireless communication device that is configured to perform a log-likelihood ratio based CINR computation process.

Turning to FIG. 2, an example of a block diagram is shown of a wireless communication device that may serve as a BS 110 or an MS 120(i) for purposes of describing the CINR computation techniques. FIG. 2 depicts MS 120(1) as an example of a wireless communication device that is configured to perform the CINR measurement techniques described herein, but again, it is to be understood that the BS 110 may also be configured to perform these techniques as well. The wireless communication device MS 120(1) comprises a transmitter 220, a receiver 230, and a controller 240. The controller 240 supplies the data to the transmitter 220 to be transmitted and processes signals received by the receiver 230. In addition, the controller 240 performs other transmit and receive control functionality. Part of the functions of the transmitter 220 and receiver 230 may be implemented in a modem and other parts of the transmitter 220 and receiver 230 may be implemented in radio transmitter and radio transceiver circuits. It should be understood that there are analog-to-digital converters (ADCs) and digital-to-analog converters (DACs) in the various signal paths to convert between analog and digital signals.

The transmitter 220 may comprise individual transmitter circuits that supply respective upconverted signals to corresponding ones of a plurality of antennas 130(1)-130(N) for transmission. The receiver 230 comprises a detector 260 for detecting the signals received at each of the antennas 130(1)-130(N) and supplies corresponding detected data, e.g., LLR data 285, to the controller 240 and to an FEC decoder 270. The receiver 230 optionally comprises an FEC encoder 280 for supplying feedback 290 to the LLR based CINR computation process 300. It is understood that the receiver 230 may comprise a plurality of receiver circuits, each for a corresponding one of a plurality of antennas 130(1)-130(N). For simplicity, these individual receiver circuits are not shown. The controller 240 comprises a memory 250 or other data storage block that stores data used for the techniques described herein. The memory 250 may be separate or part of the controller 240. Instructions for performing a LLR based CINR computation process 300 may be stored in the memory 250 for execution by the controller 240.

The functions of the controller 240 may be implemented by logic encoded in one or more tangible media (e.g., embedded logic such as an application specific integrated circuit, digital signal processor instructions, software that is executed by a processor, etc.), wherein the memory 250 stores data used for the computations described herein (and/or to store software or processor instructions that are executed to carry out the computations described herein). Thus, the LLR based CINR computation process 300 may be implemented with fixed logic or programmable logic (e.g., software/computer instructions executed by a processor). The LLR based CINR computation process 300 is described in detail hereinafter in conjunction with FIG. 3.

Figure 3:
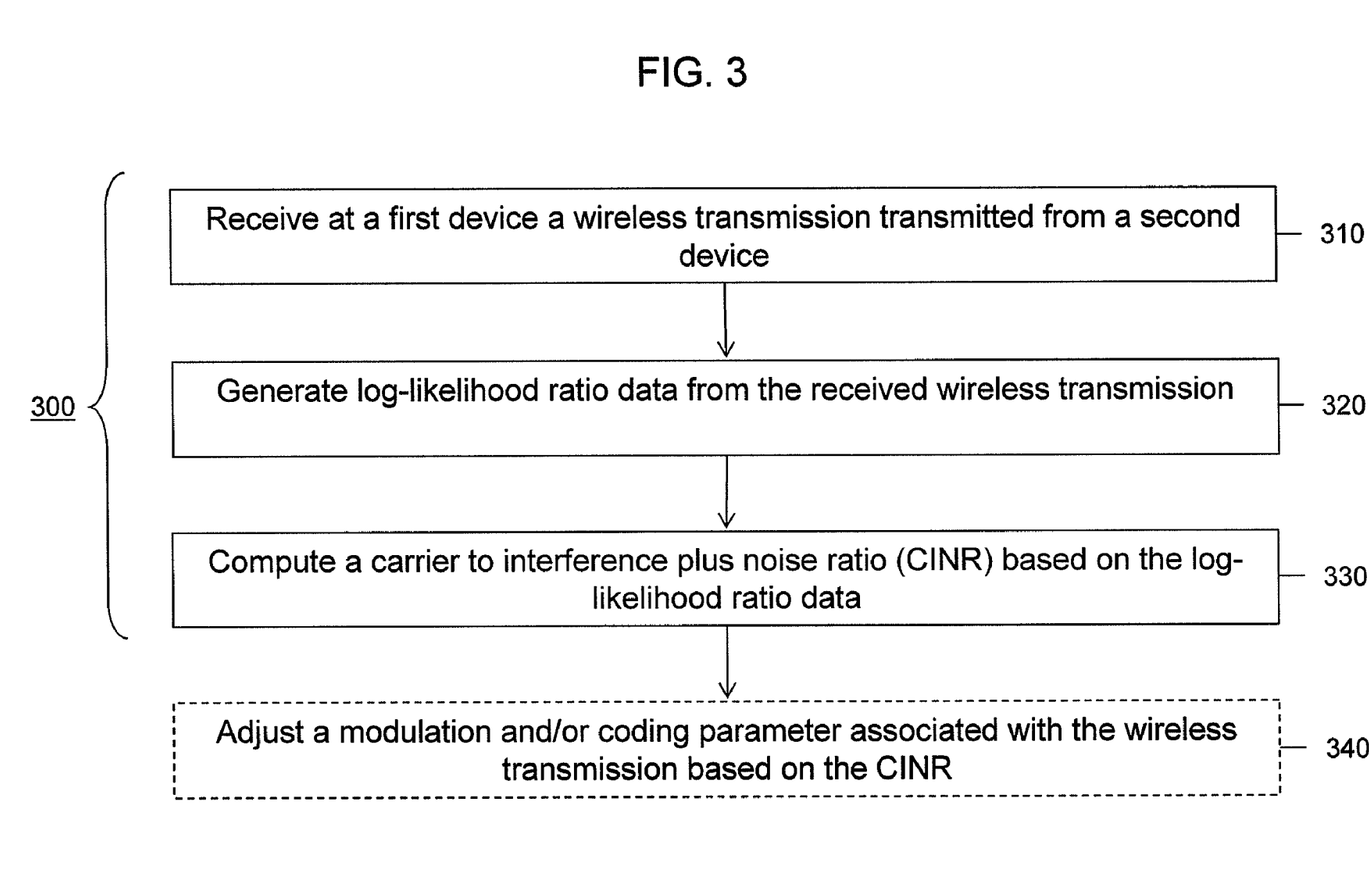
FIG. 3 is a flow chart generally depicting an example of the log-likelihood ratio based CINR computation process.

Briefly, the process 300 comprises receiving a wireless transmission at a first device sent from a second device. LLR data are generated from the received wireless transmission. CINR data are computed based on the LLR data. Adjustment data for one or more modulation and/or coding parameters associated with the wireless transmission may then be generated.

With reference to FIG. 3 and continued reference to FIG. 2, the LLR based CINR computation process 300 is now described in more detail. At 310, a transmission sent from a second device, e.g., BS 110, is received at a first device, e.g., MS 120(1), via the plurality of antennas 130(1)-130(N) of the MS 120(1). The signals received at the individual antennas 130(1)-130(N) of MS 120(1) are then fed to the detector 260. It should be understood that intermediate processing may occur, such as inverse fast Fourier transforms (IFFTs) to produce the received symbol (y), which may be performed by the controller 250, or other processing device (not shown) or by logic as discussed above.

Next, at 320 LLR data are generated from the received wireless transmission. The detector 260 generates the LLR data 285 and sends the LLR data to the FEC decoder 270 and the controller 240. The LLR data 285 are supplied as input to the FEC decoder 270 and the output of the decoder 270 is a final decision about each information bit, one or zero. Thus, the LLR data 285 contains all the information the FEC decoder 270 needs to make a decision. Therefore, the LLR data 285 probabilistically reflects the channel state information, constellation size, and any imperfect information introduced into the system (systemic error) before the FEC decoder 270. Furthermore, at this stage of signal processing, the FEC decoder 270 is blind to the transmission scheme, i.e., the FEC decoder 270 processes detected data for MIMO Alamouti transmit diversity, MIMO spatial multiplexing, SISO, etc., the same way. Thus, measurement at this stage is generic for all transceiver structures in which LLR data are generated and not dependent on the type of transmission scheme or detection scheme used.

At 330, the CINR is computed using the distribution parameters of log-likelihood ratio data. The LLR distribution parameters are derived from the LLR data 285 collected by the controller 240 as they are sent from the detector 260 to the FEC decoder 270. LLR distribution parameters are derived for the LLRs obtained from each detected symbol. In order to obtain a concise feedback based on LLR data, several parameters are used to represent the LLR data. The parameters representing LLR data contain more accurate CINR information than the existing CINR definition that is based on channel capacity. These parameters could be variety of statistical parameters from the set of collected LLRs, such as the average value of the LLRs, the average value of the absolute value of the LLRs, the variance or standard deviation of the LLRs, the variance or standard deviation of the absolute value of the LLRs, or any mathematical function based on these parameters. LLR data can be positive or negative depending on the transmitted bit and its reliability over systemic error. In general, when a transmitted bit is a '1', then LLR data should be negative and when a transmitted bit is a '0', the LLR data should be positive. Although in other embodiments other variations between transmitted bits and LLR data may be possible.

In one embodiment, at 330, the mean of the LLR data is used to estimate the received signal power and the standard deviation of the LLR data is used to estimate the noise power. The probability density function of the LLR data is considered when using MIMO (as opposed to SISO) since the mean of the LLR data for each address of a received symbol could be different depending on the transmission scheme. For example, when using 4-quadurature amplitude modulation (QAM) each constellation symbol has two addressing bits and if two symbols are transmitted, then four addressing bits (2 symbols×2 addressing bits) need to be considered to produce the correct mean LLR.

More generally the number of addressing bits is dependent on the transmission scheme. For example, when using MIMO transmission techniques, the number of addressing bits is the number of bits within the constellation/modulation symbol multiplied by the number of simultaneously transmitted symbols. In this case, the wireless transmission received at 310 may comprise a plurality of signal streams (each of which comprises a stream of symbols), and the CINR is computed at 330 such that the number of addressing bits N is equal to the number of bits within a symbol multiplied by the number of signal streams. If a different constellation/modulation scheme is used for each simultaneously transmitted symbol then the number of addressing bits is the sum of the addressing bits of the constellation/modulation of the first symbol plus the addressing bits of the constellation/modulation of the second symbol, and so on. That is, the number of addressing bits N is equal to a sum of the number of bits within each symbol over the plurality of signal streams. When using SISO transmission techniques, the number of simultaneously transmitted symbols is always one, so the number of addressing bits may be dependent directly on the modulation scheme, e.g., two addressing bits for 4-QAM, 4 addressing bits for 16-QAM, etc. The MIMO transmission scenarios described herein are applicable to any and all of the CINR computation techniques described herein.

If feedback is available from the FEC decoder 270, then decision-aided LLR based CINR computation is used at 330. In one embodiment, the decoded bit information is sent as feedback 290 to the LLR based CINR computation process 300 via the FEC encoder 280. Since an LLR corresponds to a 0 or a 1 binary value, or equivalently +A and −A, the sign of the LLR (based on the original bit value) is adjusted for the purpose of CINR calculation. However, such adjustment is only possible when either the exact binary values are known, or at least a sign-estimation of the binary values is known. Through feedback of re-encoded data, the controller obtains such knowledge and multiplies each LLR with an estimate of the appropriate sign, depending on the original decoded bit. If the decision from the decoder is known, LLR data can be chosen that corresponds to the decoded bit '0' or '1' and a more accurate CINR can be computed. The CINR can be computed as:

$$CINR = \frac{1}{N} \sum_{n=1}^{N} \frac{\text{mean}(LLR_n)^2}{\text{std}(LLR_n)^2} \quad (3)$$

where N is the number of addressing bits, mean ( ) is the averaging function, std ( ) is the standard deviation function, and $LLR_n$ represents a subset of LLR data. When the packet size is small the calculation of mean($LLR_n$) and std($LLR_n$) in Equation (3) cannot be considered reliable due to the small sample size of LLRs. When the sample size of the LLRs is small, the mean and standard deviation can be computed over the entire packet or, equivalently, over an entire set of available LLR data. In this case the CINR can be computed as:

$$CINR = \frac{\text{mean}(LLR)^2}{\text{std}(LLR)^2} \quad (4)$$

where mean ( ) is the averaging function, and std ( ) is the standard deviation function.

In another embodiment, a blind CINR measurement is computed when decoder decision feedback is not available to the LLR based CINR computation process 300. In this case, equations (3) and (4) can be modified to use the absolute values of the LLRs. As an example, equation (3) becomes:

$$CINR = \frac{1}{N} \sum_{n=1}^{N} \frac{\text{mean}(\text{abs}(LLR_n))^2}{\text{std}(\text{abs}(LLR_n))^2} \quad (5)$$

where abs ( ) is the absolute value function.

Figure 4:
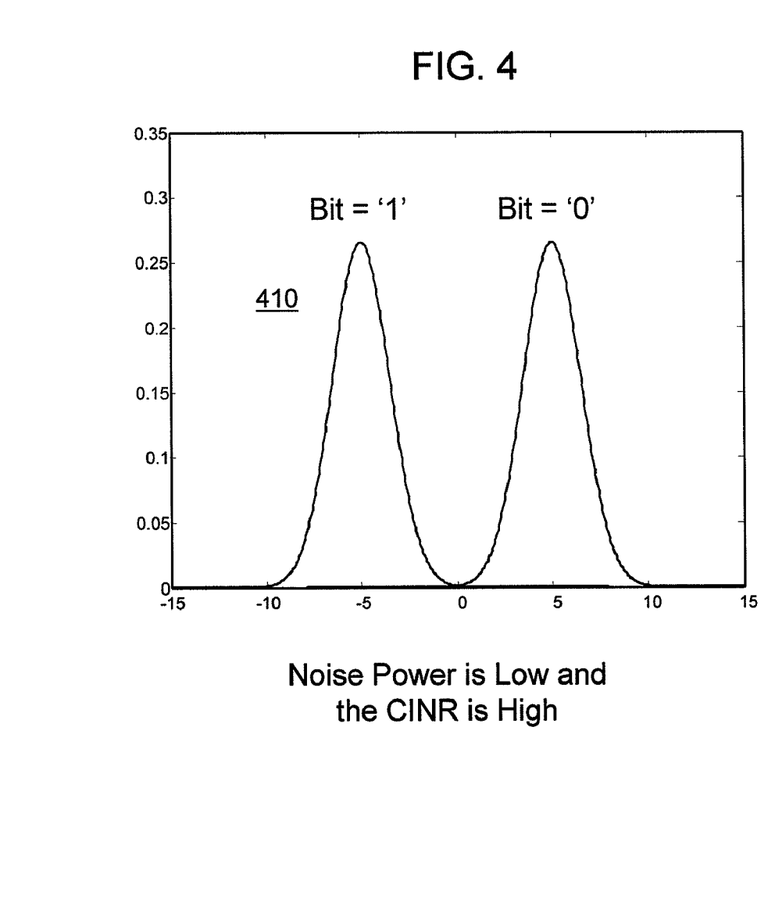
FIGS. 4 and 5 are plots that show examples of different scenarios of log-likelihood ratio data for computing the CINR.
Figure 5:
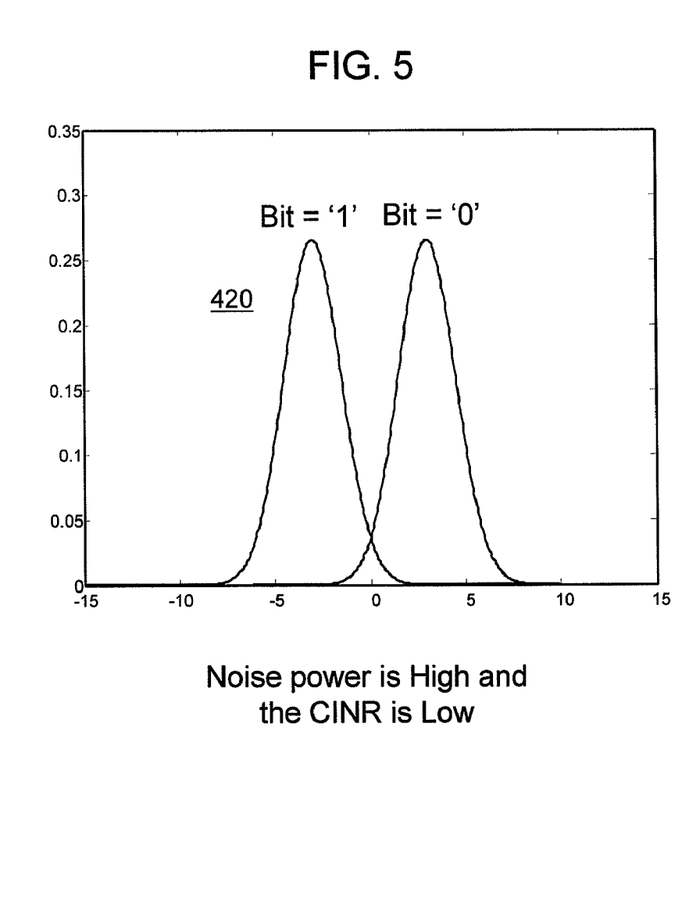

Turning now to FIGS. 4 and 5, example LLR distributions are depicted. In FIG. 4, two log-likelihood distributions are depicted for a communication environment where the noise power is low and as a result, the CINR is high. In this case, there is very little overlap in the distributions corresponding to transmitted '0' or '1' bits. In this type of communication environment both decision-aided and blind LLR based CINR computations can be achieved with a high degree of accuracy because the LLR distributions are separated. In FIG. 5, two log-likelihood distributions are depicted for a communication environment where the noise power is high and the resulting CINR is low. In this case, the distributions corresponding to transmitted '0' and '1' bits overlap and consequently the blind LLR based CINR computations are not as accurate as the decision aided LLR based CINR computations.

Turning back to FIG. 3, at 330 as described above, the CINR computations are made on a bit-level basis. In another embodiment, the CINR computation may be made on a symbol-level basis or packet-level basis. When the LLR based CINR computations are made on a symbol-level basis the computed CINR values are compensated for before adjustments can be made to modulation and/or coding parameters associated with the wireless transmission. Table 1 depicts an example set of compensation values for a quadrature amplitude modulation (QAM) transmission scheme. If, for example, the LLR based CINR is computed at the symbol level for 4-QAM, then 3 dB would be added to the computed CINR. A similar compensation method may be useful when the CINR computation goes beyond the bit level, e.g., when using equation (4) to compute CINR over an entire packet.

TABLE 1

Symbol Level CINR Compensation

| Modulation Scheme | Compensation (dB) |
|---|---|
| 4-QAM | 3 |
| 16-QAM | 6 |
| 64-QAM | 7.78 |

$LLR_{symbol} = LLR_{bit} +$ Compensation

At 340, adjustment data for a modulation and/or coding parameter associated with the wireless transmission based on the computed CINR is generated. FIG. 3 shows that the adjustment performed at 340 is not actually part of the CINR computation process 300, and as explained herein may be performed in the same device that makes the CINR computation or in another device. Table 2 depicts possible modulation and/or coding scheme adjustments that can be selected based on the computed CINR for a 64-state convolutional code. Other codes may result in different tables. For example, if the CINR is computed at the bit-level, or compensated for at the symbol-level, and is in the range of 4.5 dB, then the modulation and coding would be adjusted to 4-QAM, rate 3/4.

TABLE 2

MCS Selection Table

| Computed CINR (dB) | Modulation and Coding |
|---|---|
| 3.4 | 4-QAM, rate 1/2 |
| 4.5 | 4-QAM, rate 3/4 |
| 6.3 | 16-QAM, rate 1/2 |
| 7 | 16-QAM, rate 3/4 |
| 7.38 | 64-QAM, rate 1/2 |
| 7.98 | 64-QAM, rate 3/4 |

As explained above, the device that makes the LLR-based CINR measurements may be the device on wireless communication link that generates the adjustment data for the modulation and/or coding scheme and may transmit that adjustment data (selection of a different modulation scheme and or coding rate) to the other device on the link where the actual adjustment to the modulation and/or coding scheme is made. Alternatively, the device that makes the LLR-based CINR measurement may transmit the CINR measurement data to the other device on the link (e.g., to the BS) where the adjustment or selection of a different modulation scheme and/or coding rate is made.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   receiving at a first device a wireless transmission transmitted from a second device;
   generating log-likelihood ratio data from the received wireless transmission;
   computing mean and standard deviation values for subsets of the log-likelihood ratio data;
   computing a carrier to interference plus noise ratio (CINR) based on a summation of the ratios of the mean values to the standard deviation values of the subsets of the log-likelihood ratio data; and
   adjusting a modulation and/or coding parameter associated with the wireless transmission based on the CINR.

2. The method of claim 1, and further comprising computing adjustment data for the modulation and/or coding parameter at the first device and transmitting the adjustment data to the second device.

3. The method of claim 1, and further comprising transmitting the CINR from the first device to the second device, wherein the second device computes an adjustment for the modulation and/or coding parameter based on the CINR.

4. The method of claim 1, wherein generating comprises generating the log-likelihood ratio data at a detector in the first device, and outputting the log-likelihood ratio data from the detector to an input of a decoder in the first device.

5. The method of claim 4, wherein computing the CINR is based on decisions made by the decoder using the log-likelihood ratio data.

6. The method of claim 5, wherein computing the CINR comprises computing:

$$CINR = \frac{1}{N} \sum_{n=1}^{N} \frac{\text{mean}(LLR_n)^2}{\text{std}(LLR_n)^2}$$

where N is the number of addressing bits corresponding to a constellation and/or modulation symbol used to transmit the wireless transmission, and $LLR_n$ is a subset of log-likelihood ratio data corresponding to the addressing bit n.

7. The method of claim 6, wherein receiving the wireless transmission comprises receiving a plurality of signal streams simultaneously transmitted from the second device to the first device using multiple-input multiple-output techniques, each signal stream comprising a stream of symbols, and wherein computing comprises computing the CINR such that the number of addressing bits N is equal to the number of bits within a symbol multiplied by the number of signal streams.

8. The method of claim 6, wherein computing further comprises computing the mean and standard deviation over an entire set of available log-likelihood ratio data.

9. The method of claim 6, wherein receiving the wireless transmission comprises receiving a plurality of signal streams simultaneously transmitted from the second device to the first device using multiple-input multiple-output techniques, each signal stream comprising a stream of symbols transmitted according to a different constellation/modulation scheme, and wherein computing comprises computing the CINR such that the number of addressing bits N is equal to a sum of the number of bits within each symbol over the plurality of signal streams.

10. The method of claim 1, wherein computing the CINR comprises computing:

$$CINR = \frac{1}{N} \sum_{n=1}^{N} \frac{\text{mean}(\text{abs}(LLR_n))^2}{\text{std}(\text{abs}(LLR_n))^2}$$

where N is the number of addressing bits corresponding to a constellation and/or modulation scheme used to transmit the wireless transmission, and $LLR_n$ is the subset of log-likelihood ratio data that correspond to the addressing bit n.

11. The method of claim 10, wherein receiving the wireless transmission comprises receiving a plurality of signal streams simultaneously transmitted from the second device to the first device using multiple-input multiple-output techniques, each signal stream comprising a stream of symbols, and wherein computing comprises computing the CINR such that the number of addressing bits N is equal to the number of bits within a symbol multiplied by the number of signal streams.

12. The method of claim 10, wherein computing further comprises computing the mean and standard deviation over an entire set of available log-likelihood ratio data.

13. The method of claim 10, wherein receiving the wireless transmission comprises receiving a plurality of signal streams simultaneously transmitted from the second device to the first device using multiple-input multiple-output techniques, each signal stream comprising a stream of symbols transmitting according to a different constellation/modulation scheme, and wherein computing comprises computing the CINR such that the number of addressing bits N is equal to a sum of the number of bits within each symbol over the plurality of signal streams.

14. The method of claim 1, wherein computing the CINR is on a bit-level basis.

15. The method of claim 1, wherein computing the CINR is on a symbol-level basis.

16. An apparatus comprising:
a receiver that receives a wireless transmission transmitted from a second communication apparatus;
a detector coupled to the receiver and configured to generate log-likelihood ratio data from the received wireless transmission; and
a controller coupled to the detector and configured to:
compute mean and standard deviation values for subsets of the log-likelihood ratio data;
compute a carrier to interference plus noise ratio (CINR) based on a summation of the ratios of the mean values to the standard deviation values of the subsets of the log-likelihood ratio data; and
generate adjustment data for a modulation and/or coding parameter associated with the wireless transmission based on the CINR.

17. The apparatus of claim 16, and further comprising a transmitter configured to transmit the adjustment data for the modulation and/or coding parameter, and/or to transmit the CINR to the second communication apparatus.

18. The apparatus of claim 16, further comprising a decoder coupled to the detector, wherein the log-likelihood ratio data is output from the detector to an input of the decoder.

19. The apparatus of claim 18, wherein the controller is further configured to compute the CINR based on decisions made by the decoder using the log-likelihood data.

20. The apparatus of claim 19, wherein the controller is further configured to compute the CINR as:

$$CINR = \frac{1}{N} \sum_{n=1}^{N} \frac{\text{mean}(LLR_n)^2}{\text{std}(LLR_n)^2}$$

where N is the number of addressing bits corresponding to a constellation and/or modulation scheme used to transmit the wireless transmission, and $LLR_n$ is the subset of log-likelihood ratio data that correspond to the addressing bit n.

21. The apparatus of claim 16, wherein the controller is further configured to compute the CINR as:

$$CINR = \frac{1}{N} \sum_{n=1}^{N} \frac{\text{mean}(\text{abs}(LLR_n))^2}{\text{std}(\text{abs}(LLR_n))^2}$$

where N is the number of addressing bits corresponding to a constellation and/or modulation scheme used to transmit the wireless transmission, and $LLR_n$ is the subset of log-likelihood ratio data that correspond to the addressing bit n.

22. A non-transitory computer readable media encoded with logic that when executed by a processor is operable to cause the processor to:
generate log-likelihood ratio data associated with reception of a wireless transmission at a first device that is transmitted from a second device;
compute mean and standard deviation values for subsets of the log-likelihood ratio data;
compute a carrier to interference plus noise ratio (CINR) based on a summation of the ratios of the mean values to the standard deviation values of the subsets of the log-likelihood ratio data; and
adjust a modulation and/or coding parameter associated with the wireless transmission based on the CINR.

23. The non-transitory computer readable media of claim 22, and further encoded with logic that when executed by the processor is operable to cause the processor to compute adjustment data for the modulation and/or coding parameter at the first device for transmission to the second device.

24. The non-transitory computer readable media of claim 22, wherein the logic that causes the processor to generate the log-likelihood ratio data is implemented in a detector in the first device, and wherein the log-likelihood ratio data is output from the detector to an input of a decoder in the first device.

25. The non-transitory computer readable media of claim 24, wherein the logic that causes the processor to compute the CINR is based on decisions made by the decoder using the log-likelihood ratio data.

26. The non-transitory computer readable media of claim 25, wherein the logic that causes the processor to compute the CINR comprises logic that causes the processor to compute:

$$CINR = \frac{1}{N} \sum_{n=1}^{N} \frac{\text{mean}(LLR_n)^2}{\text{std}(LLR_n)^2}$$

where N is the number of addressing bits corresponding to a constellation and/or modulation scheme used to transmit the wireless transmission, and $LLR_n$ is the subset of log-likelihood ratio data that correspond to the addressing bit n.

27. The non-transitory computer readable media of claim 22, wherein the logic that causes the processor to compute the CINR comprises logic that causes the processor to compute:

$$CINR = \frac{1}{N} \sum_{n=1}^{N} \frac{\text{mean}(\text{abs}(LLR_n))^2}{\text{std}(\text{abs}(LLR_n))^2}$$

where N is the number of addressing bits corresponding to a constellation and/or modulation scheme used to transmit the wireless transmission, and $LLR_n$ is the subset of log-likelihood ratio data that correspond to the addressing bit n.

\* \* \* \* \*